United States Patent
Vossen et al.

(10) Patent No.: US 8,176,083 B2
(45) Date of Patent: May 8, 2012

(54) GENERIC DATA OBJECT MAPPING AGENT

(75) Inventors: Oliver Vossen, Walldorf (DE); Maic Wintel, Walldorf (DE)

(73) Assignee: SAP AG, Walldorf (DE)

( * ) Notice: Subject to any disclaimer, the term of this patent is extended or adjusted under 35 U.S.C. 154(b) by 388 days.

(21) Appl. No.: 12/338,693

(22) Filed: Dec. 18, 2008

(65) Prior Publication Data

US 2010/0161627 A1 Jun. 24, 2010

(51) Int. Cl.
G06F 7/00 (2006.01)

(52) U.S. Cl. .................. 707/796; 707/797

(58) Field of Classification Search ............... 707/756, 707/755, 763, 797, 796
See application file for complete search history.

(56) References Cited

U.S. PATENT DOCUMENTS

| | | | |
|---|---|---|---|
| 2006/0200753 A1* | 9/2006 | Bhatia et al. | 715/505 |
| 2007/0136396 A1* | 6/2007 | Kulkarni et al. | 707/204 |
| 2007/0203923 A1* | 8/2007 | Thomas | 707/100 |
| 2008/0228697 A1* | 9/2008 | Adya et al. | 707/2 |
| 2008/0228782 A1* | 9/2008 | Murayama et al. | 707/100 |
| 2010/0082646 A1* | 4/2010 | Meek et al. | 707/752 |

* cited by examiner

*Primary Examiner* — Amy Ng
(74) *Attorney, Agent, or Firm* — Fish & Richardson P.C.

(57) ABSTRACT

This disclosure relates to computer implemented methods, systems, and software for automatically preparing data from a data object used in an enterprise software application. Updates can be received for first and second data objects, the data objects each including hierarchical data with at least one node. The data objects can be associated with a service-oriented enterprise software application. A mapping, from the first data object to a first structured data element, can be identified using a first mapping agent. A mapping, from the second data object to a second structured data element, can be identified using a first mapping agent. In some instances, data can be loaded from at least one of the first or second data objects using the first mapping agent. Loading data from the data object can be based on the mapping from the data object to the respective structured data element.

19 Claims, 10 Drawing Sheets

GENERIC DATA OBJECT MAPPING AGENT

TECHNICAL FIELD

This disclosure relates to computer systems and methods and, more particularly, to methods, systems, and software for utilizing a generic data object mapping agent within an object-based, or service-oriented, software environment.

BACKGROUND

Enterprise software systems are generally large and complex. Such systems can require many different components, distributed across many different hardware platforms, possibly in several different geographical locations. In order to design, configure, update or implement an enterprise software system, one is generally required to understand details of the system at varying levels, depending on his role in designing, managing or implementing the system. For example, a systems administrator may need a high-level technical understanding of how various software modules are installed on physical hardware, such as a server device or a network, and how those software modules interact with other software modules in the system. A person responsible for configuring the software may utilize a high-level functional understanding of the operations that each functional component provides. An application designer may utilize a low-level technical understanding of the various software interfaces that portions of the application require or implement. An application developer may utilize a detailed understanding of the interfaces and functionality he is implementing in relation to the remainder of the system. But the flow of a business process within an application today is typically hidden from a user. In some cases, it is possible to manually create a textual or graphical documentation of this process flow. However, this documentation is typically not detailed enough and can become quickly outdated since its consistency with the actual application software is not (initially) verified or maintained automatically.

Within a development environment, an application can be developed using modeling systems. In general, these models can specify the types of development objects or components that can be used to build applications, as well as the relationships that can be used to connect those components. In an object-oriented architecture, for example, a defined application can include a combination of various data objects and resources (i.e., development objects). In that example, relationships among the development objects can include a relationship indicating that one data object inherits characteristics from another data object. Further, data objects and data object fields can have hierarchical relationships, with relationships between data objects and data object fields can be hierarchical, in that a data object is related to a second data object through a shared relationship with a third data object or data object field, etc.

Dedicated reporting and analytics modularity can also be provided with enterprise software deployments. While certain flows, functionality, and infrastructure may be hidden from enterprise customers to protect enterprise system integrity, in addition to modeling, customers can be provided with customized reporting and querying functionality in connection with the enterprise software deployment. To protect functionality and infrastructure of the system, specialized query data structures can be developed drawing from data structures and data relationships of the system and delivered applications, that can be used in connection with the reporting module to process queries relating to the data structures upon which the specialized query data structures are based. Where specialized query data structures do not yet exist for an underlying data structure, the specialized query data structures can be "staged" by developers, in essence converting the underlying data structure and its relational attributes within the system into a corresponding query data structure capable of being processed and queried by the reporting module. Staging of specialized data structures and conversions into query data structures can involve the creation of unique data conversion modules, or agents, specialized to handle the underlying data structure and corresponding data conversion type.

SUMMARY

This disclosure relates to computer implemented methods, systems, and software for automatically preparing data from a data object used in an enterprise software application. Updates can be received for first and second data objects, the data objects each including hierarchical data with at least one node. The data objects can be associated with a service-oriented enterprise software application. A mapping, from the first data object to a first structured data element, can be identified using a first mapping agent. A mapping, from the second data object to a second structured data element, can be identified using a first mapping agent. In some instances, data can be loaded from at least one of the first or second data objects using the first mapping agent. Loading data from the data object can be based on the mapping from the data object to the respective structured data element.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

At a high level, this disclosure involves applications modeled on a service-oriented architecture (SOA). In some cases, these applications may utilize or implement analytics that provide information workers with comprehensive views they need to take actions guided by strategies that are appropriate, timely, and in concert with colleagues and the rest of the value network. In other words, fact-based understanding of customers and prospects—as well as suppliers, partners, employees, and broader economic indicators—can be used in both strategic and operational processes. In some cases, these analytics deliver insights across the extended value network, spanning multiple business functions, departments, and even organizations. Plus, the analytic functions are usually designed for information workers, so they can be easy to use, modify, and extend.

More specifically, this disclosure generally describes an example technique for converting business data objects used in SOA software applications, into data object-specific query data structures for use in the analytics infrastructure of the SOA environment. A standardized, data structure agnostic, or otherwise generic software module can be employed such that a variety of different business data objects can be converted into their query data structure equivalents. The standardized software module, or generic agent, can exploit common hierarchical relationship paradigms, and other attributes common between data objects, to provide a one-size-fits-all approach to building query data structures for each of the many business data objects as these structures are needed by the system's analytics framework. Standardizing query data structure building allows the reporting functionality of the system to enjoy, among other benefits, increased extensibility and customizability by the end user or customer. As a generic conversion agent is deployed capable of handling query data structure conversions across business data objects, staging steps previously required to build individual query data structures, including the development of data object-specific conversion agents, can be reduced or eliminated. Development resources can thereby be utilized more efficiently, diverted toward other system goals, rather than the development of data-object-specific conversion agents. While the foregoing may be realized in various configurations, some or all of these examples may not be realized in every configuration or situation.

Figure 1:
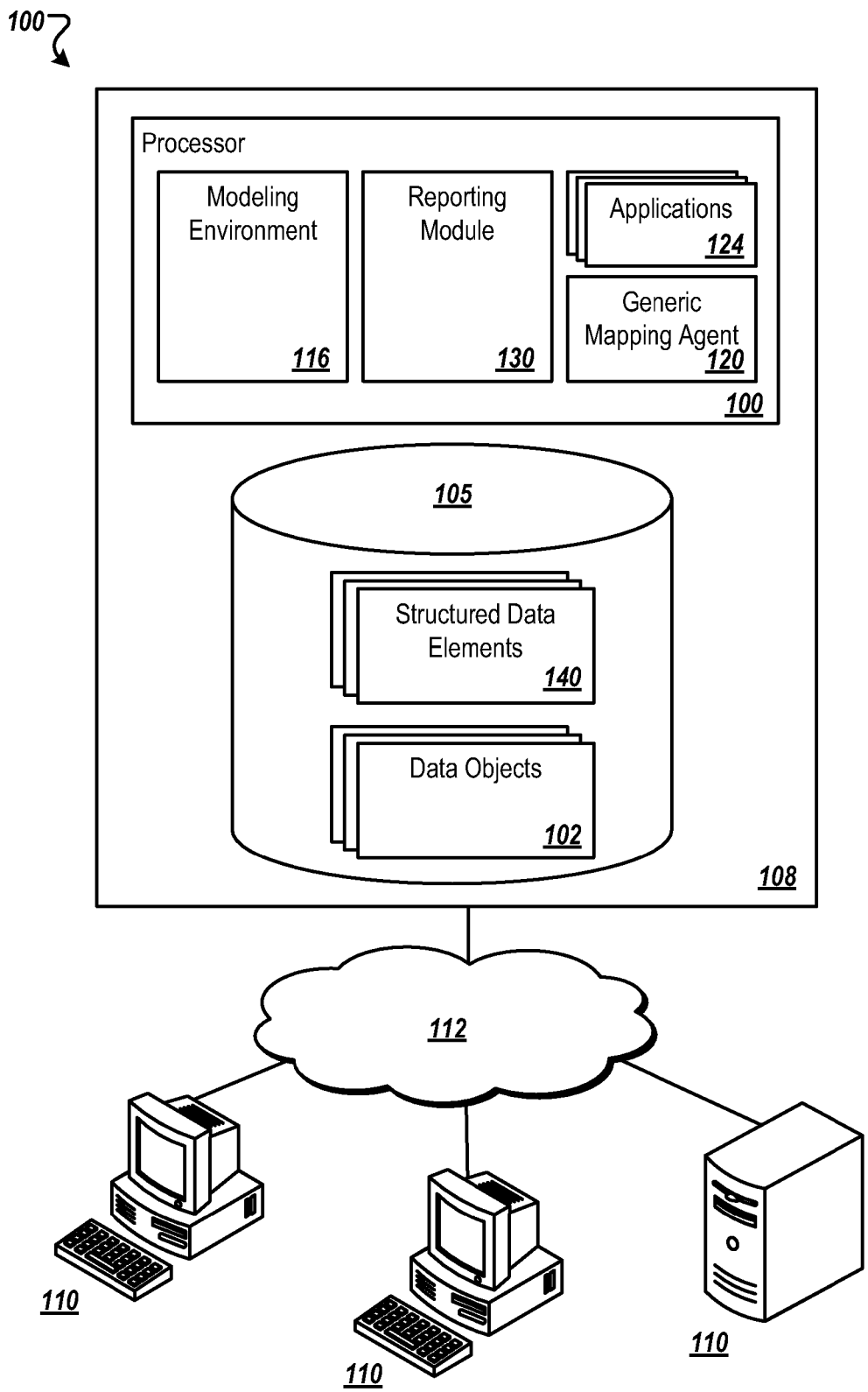
FIG. 1 illustrates an example an object-based, or service-oriented, software environment in accordance with one embodiment of the present disclosure.

Turning to the illustrated embodiment, FIG. 1 illustrates an example enterprise software environment 100. Environment 100 is typically a distributed client/server system that spans one or more networks such as 112. In some situations, rather than being delivered as packaged software, portions of environment 100 may represent a hosted solution, often for an enterprise or other small business, that may scale cost-effectively and help drive faster adoption. In this case, portions of the hosted solution may be developed by a first entity, while other components may be developed by a second entity. Moreover, the processes or activities of the hosted solution may be distributed amongst these entities and their respective components. In other embodiments, environment 100 may be in a dedicated enterprise environment—across a local area network or subnet—or any other suitable environment without departing from the scope of this disclosure.

Turning to the illustrated embodiment, environment 100 includes, or is communicably coupled, with server 108 and one or more clients 110, at least some of which communicate across network 112. Server 108 comprises an electronic computing device operable to receive, transmit, process and store data associated with environment 100. For example, server 108 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 108 that may be used with the disclosure, environment 100 can be implemented using computers other than servers, as well as a server pool. Indeed, server 108 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 108 may be adapted to execute any operating system including Linux, UNIX, Windows Server, or any other suitable operating system. According to one embodiment, server 108 may also include or be communicably coupled with a web server and/or a mail server.

Illustrated server 108 includes example processor 120. Although FIG. 1 illustrates a single processor 120 in server 108, two or more processors may be used according to particular needs, desires, or particular embodiments of environment 100. Each processor 120 may be a central processing unit (CPU), a blade, an application specific integrated circuit (ASIC), or a field-programmable gate array (FPGA). The processor 120 may execute instructions and manipulate data to perform the operations of server 108, often using software. Regardless of the particular implementation, "software" may include computer-readable instructions, firmware, wired or programmed hardware, or any combination thereof on tangible medium as appropriate. Indeed, each software component may be fully or partially written or described in any appropriate computer language including C, C++, Java, Visual Basic, assembler, Perl, any suitable version of 4GL, as well as others. It will be understood that while the software illustrated in FIG. 1 is shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Server 108 often includes memory 105. Memory 105 may include any local or remote memory or database module and may take the form of volatile or non-volatile memory including, without limitation, magnetic media, optical media, random access memory (RAM), read-only memory (ROM), removable media, or any other suitable local or remote memory component. Illustrated memory 105 includes one or more data objects 102 and structured data elements 140. Memory 105 may also include any other appropriate data such as HTML files or templates, data classes or object interfaces, software applications or sub-systems, and others (whether illustrated or not). For example, memory 105 may include pointers or other references to data objects 102 that were published to a location remote from server 108.

In the illustrated embodiment, processor 120 executes a model-driven development tool (or environment) 116 and modeled business applications 124. At a high level, the modeling environment 116 and applications 124 are operable to receive and/or process requests from developers and/or users and present at least a subset of the results to the particular user via an interface. Put differently, different instances of the modeling tool may be executed for developers and for end users, perhaps using client 110.

The client 110 is any computing device operable to process data for an end user. For example, it may connect or communicate with the server or the network using a wireless connection, or it may be a stand alone device. At a high level, each client includes at least the GUI and, in some cases, an agent and comprises an electronic computing device operable to receive, transmit, process and store any appropriate data associated with the backup system. It will be understood that there may be any number of clients communicably coupled to the server. For example, the clients can include one local client and three external clients to the illustrated portion of the network. Further, "the client," "analyst," and "user" may be used interchangeably, as appropriate, without departing from the scope of this disclosure. For example, the investor may also be a user of the client. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device. For example, the client may be a laptop that includes an input device, such as a keypad, touch screen, mouse, or other device that can accept information, and an output device that conveys information associated with the operation of the server or the clients, including digital data, visual information, or the GUI. Both the input device and output device may include fixed or removable storage media, such as a magnetic computer disk, CD-ROM, or other suitable media to both receive input from and provide output to users of the clients through the display, namely the GUI.

The GUI comprises a graphical user interface operable to, for example, allow the user of the client to interface with at least a portion of the platform for any suitable purpose, such as creating, preparing, requesting, or analyzing analytics and associated queries and reports. Generally, the GUI provides the particular user with an efficient and user-friendly presentation of business data provided by or communicated within the system. The GUI may comprise a plurality of customizable frames or views having interactive fields, pull-down lists, and buttons operated by the user. The GUI is often configurable, supports a combination of tables and graphs (bar, line, pie, status dials, etc.), and is able to build real-time portals, where tabs are delineated by key characteristics (e.g. site or micro-site). The GUI is further operable to generate or request historical reports. Generally, historical reports provide critical information on what has happened including static or canned reports that require no input from the user and dynamic reports that quickly gather run-time information to generate the report. Therefore, the GUI contemplates any suitable graphical user interface, such as a combination of a generic web browser, intelligent engine, and command line interface (CLI) that processes information in the platform and efficiently presents the results to the user visually. The server can accept data from the client via the web browser (e.g., Microsoft Internet Explorer or Mozilla Firefox) and return the appropriate HTML or XML responses to the underlying engine using the network.

The network 112 facilitates wireless or wireline communication between the server and any other local or remote computer, such as the clients. The network may be all or a portion of an enterprise or secured network. In another example, the network may be a virtual private network (VPN) merely between the server and the client across wireline or wireless link. Such an example wireless link may be via 802.11a, 802.11b, 802.11g, 802.11n, 802.20, WiMax, and many others. While described as a single or continuous network, the network may be logically divided into various subnets or virtual networks without departing from the scope of this disclosure, so long as at least portion of the network may facilitate communications between the server and at least one client. In other words, the network encompasses any internal or external network, networks, sub-network, or combination thereof operable to facilitate communications between various computing components in the system. The network may communicate, for example, Internet Protocol (IP) packets, Frame Relay frames, Asynchronous Transfer Mode (ATM) cells, voice, video, data, and other suitable information between network addresses. The network may include one or more local area networks (LANs), radio access networks (RANs), metropolitan area networks (MANs), wide area networks (WANs), all or a portion of the global computer network known as the Internet, and/or any other communication platform or systems at one or more locations. In certain embodiments the network may be a secure network associated with the enterprise and certain local or remote clients.

Returning to the example modeling environment 116, the environment 116 may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries, while enforcing security requirements. Indeed, the modeling environment 116 may provide a shared set of services for finding, organizing, and accessing unstructured content stored in third-party repositories, and content management systems across various networks 112. Classification tools may automate the organization of information, while subject-matter experts and content managers can publish information to distinct user audiences. Regardless of the particular implementation or architecture, this modeling environment 116 may allow the developer to easily model various elements using this model-driven approach. As described in more detail later, the model is deployed, and environment 100 may translate the model into the required code or data structures for at least one application 124 or web service. This deployed business application 124 may then be modified or enhanced, as appropriate, using the modeling environment 116.

Application 124 may represent any modeled software or other portion of business functionality or logic. A first instance of application 124 may represent a first application that is .NET-based, while a second instance of application 124 may be a similar hosted web-based solution. In yet another example, application 124 may be a modeled composite application with any number of portions that may be implemented as Enterprise Java Beans (EJBs), or the design-time components may have the ability to generate run-time embodiments into different platforms such as J2EE, ABAP (Advanced Business Application Programming) objects, or Microsoft's .NET. Further, while illustrated as internal to server 108, one or more processes associated with modeling environment 116 or application 124 may be stored, referenced, or executed remotely. For example, a portion of an application may be a web service that is remotely called, while another portion of the application may be an interface object bundled for processing at remote client 110. Moreover, modeling environment 116 or application 124 may each be a child or sub-module of other respective software modules or enterprise applications (not illustrated) without departing from the scope of this disclosure.

In some instances, business applications 124 may be operable to exchange data with a plurality of enterprise-based systems and, in the process, update or modify one or more content repositories 105. The various services performed may allow the business application 124 to orchestrate one or more business processes in synchronization with other processes that directly or indirectly affect the information stored within one or more of the content repositories 105. For instance, business applications 124 may drive business processes across different applications, systems, technologies, and organizations, thus driving end-to-end business processes across heterogeneous systems or sub-systems. A business application 124 can be, for example, a pricing, inventory, sales order, or other business application. A business application 124 can produce and/or receive transactional data, for example, transactional data stored or managed in data objects 102. For example, business data objects 102 can include transactional data including pricing changes, sales orders, financial transactions, or any other business transactional data. The business application 124 can produce, receive, process, or otherwise be associated with transactional data. For example, transactional data can include pricing changes, sales orders, financial transactions, or any other business transactional data.

In particular, the application 124 can be implemented to realize a software application that implements enterprise application service interfaces using a number of elements associated with and defining its architectural design. The elements of the application's 124 architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

Generally, the architectural elements of the application 124 include the business object. A business object is a representation of a type of a uniquely identifiable business entity (an object instance) described by a structural model. Processes operate on business objects. A business object represents a specific view of some well-defined business content. A business object represents content, and instances of business objects include content, which a typical business user would expect and understand with little explanation. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

Business objects can be further categorized as business process objects, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data representing a business entity or functionality that is valid for a point in time) and exposes services or interfaces that transform that data. A mass data run object is an application object that executes an algorithm for a particular mass data run. An instance of a mass data run object embodies or contains a particular set of selections and parameters. A mass data run object implements an algorithm that modifies, manages, and/or processes a large amount of data in multiple transactions, possibly, but not necessarily, with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not typically have its own persistency.

While the logical and operational flow of the various business objects within the environment 100 and the delivered applications may be hidden from a customer, it may nonetheless be desirable to allow customers (or other end users) some degree of access to the data embodied in these business objects and processed by these applications. Enterprises often use reporting and analytical tools to query and summarize data underlying their business in order to make important business decisions. Similarly, it can also be desirable to provide business customers with tools, in connection with environment 100, to allow queries and reports to be designed and produced from data processed and gathered through the applications of environment 100. Accordingly, in some instances of environment 100, reporting module 130 can be provided to provide analytics functionality to service-oriented application 124.

Specifically, the processor 120 can perform additional operations of server 108 including providing reporting, querying, and analytics support and functionality to customers through reporting module 130. Reporting module 130 can allow customers to query data from architecture elements including business objects, providing customers with the ability to generate reports pertaining to the services and customer-specific solutions provided through software environment 100. For example, the reporting module 130 may comprise an analytics composite application that helps enable users to gain credible, clear, and comprehensive business insights. This example application may normally leverage the business content and infrastructure to unify and integrate disparate data and processes from a service provider, third-party, and custom corporate applications, legacy systems, and externally syndicated information sources. The reporting module 130 provides information workers with the comprehensive views they need to take actions guided by strategy that are appropriate, timely, and in concert with their colleagues and the rest of their value network. Reporting module 130 may deliver insights across the extended value network, spanning multiple business functions, departments, and even organizations. Plus, the analytic functions are often designed for information workers so they may be easy to use, modify, and extend. It will be understood that while illustrated as part of server 108, the reporting module is most often utilized by business analysts or other end users, and therefore may be executing on client 110. Modeling agents, including generic mapping agents 120, can be used by server 108 to prepare data for use by the reporting module 130. Additionally, in some instances, business applications 124 themselves can access and use reporting module 130 to generate reports. Generated reports can be displayed on the client 110. Reports can include transactional data and can also include structured data elements 140.

Structured data elements 140 can be data extracted from multiple transactional data sources, such as data objects 102, aggregated and compiled within a unified aggregated data element 140. For example, sales totals for a particular time period can be summed, or a minimum and maximum daily sales total can be calculated. In another example, pricing information can be extracted from larger transactional data structures and be stored in a more efficient aggregate table for reporting. Structured data elements 140 can include one or more key figures columns, which can each store an aggregated data value associated with a group of data. Structured data elements 140 can be populated from multiple sets of transactional data and according to data aggregating functions supported by system 100. Structured data elements 140 can be maintained in response to changes in transactional data. Structured data elements 140, as well as transactional data, can be formatted, stored, or defined as various data structures in relational database tables, business objects 102, eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each data structure may comprise one table or file or a plurality of tables or files stored on one computer or across a plurality of computers in any appropriate format as described above. Indeed, some or all of the particular structure may be local or remote without departing from the scope of this disclosure and store any type of appropriate data.

Figure 2A:
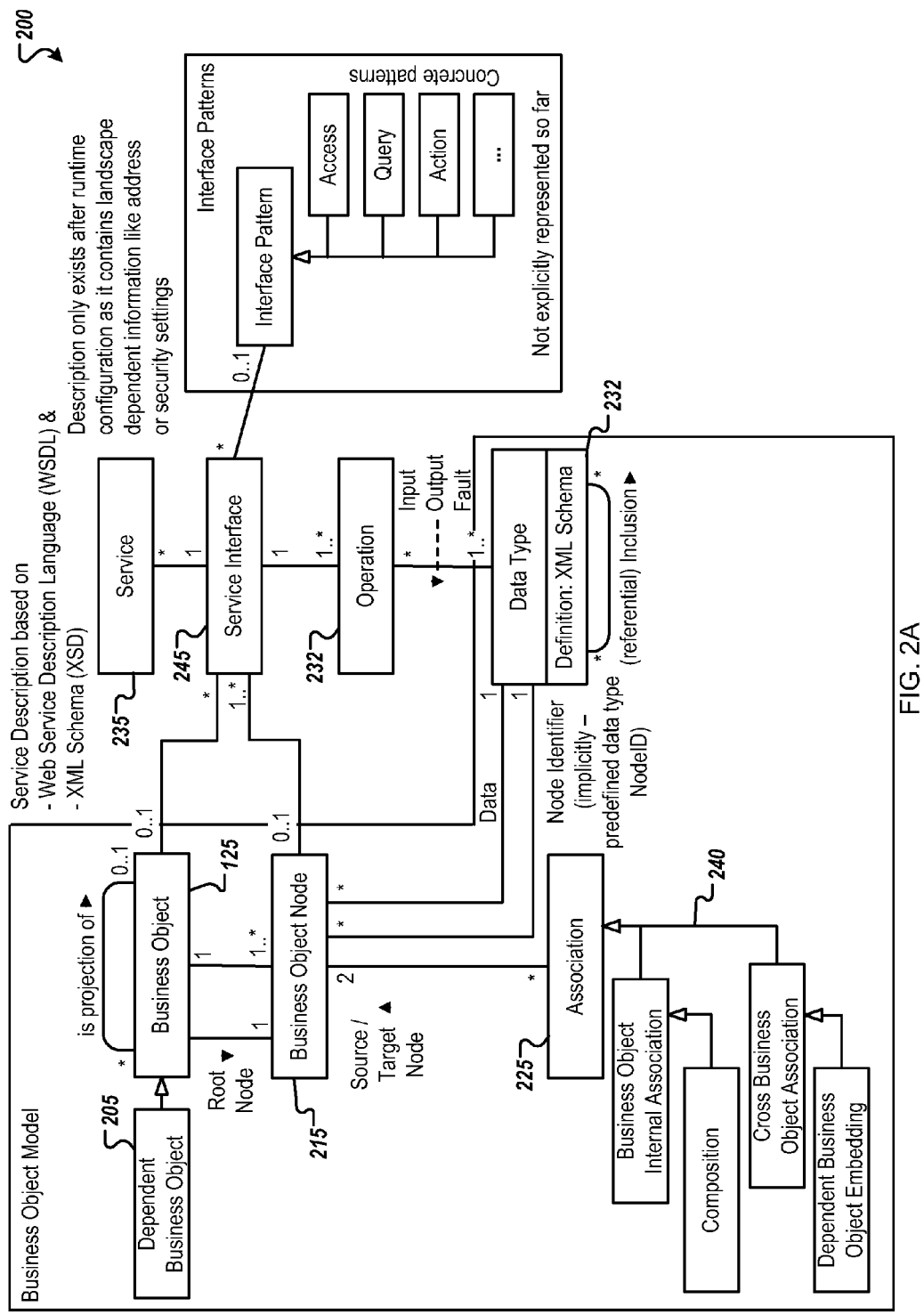
FIG. 2A depicts an example metamodel of a business object for use in a system such as that described in FIG. 1.

FIG. 2A illustrates an example business object model that includes various entities. The overall structure of the business object model ensures the consistency of the interfaces that are derived from the business object model. The derivation ensures that the same business-related subject matter or concept is represented and structured in the same way in all interfaces. The business object model defines the business-related concepts at a central location for a number of business transactions. In other words, it reflects the decisions made about modeling the business entities of the real world acting in business transactions across industries and business areas. The business object model, which serves as the basis for the process of generating consistent interfaces, includes the elements contained within the interfaces. These elements are arranged in a hierarchical structure within the business object model. In other words, the business object model is defined by the business objects and their relationship to each other (the overall net structure).

Entities are discrete business elements that are used during a business transaction. Entities are not to be confused with business entities or the components that interact to perform a transaction. Rather, "entities" are one of the layers of the business object model and the interfaces. Each business object 102 has a business object model conforming generally to model 200. The model 200 relates the business object 102 to its dependent business objects 205 as well as one or more business object nodes 215. A dependent business object 205 is not a stand-alone data object, but is instead a part of business object 102 capable of being used and re-used by other business objects interfacing with business object 102. A business object node 215 relates how a business object relates to other business objects, for example, associations 225 between the object 102 and another source or target business object. An association or a referential relationship type describes a relationship between two objects in which the dependent object refers to the less dependent object. For example, a person has a nationality, and thus, has a reference to its country of origin. There is an association between the country and the person. In some instances, business objects can be organized and inter-related in a hierarchical structure, in which case, the node 215 defines the relational placement of the business object 102 within the hierarchy. One or more data types are additionally associated with the business object 102 in the business object model 200. Data types are used to type object entities and interfaces with a structure. This typing can include business semantic. The business object 102 can be used within the context of a service having a service interface, and operation 232.

The relationships between the various entities have cardinalities. The cardinality between a first entity and a second entity identifies the number of second entities that could possibly exist for each first entity. Thus, a 1:c cardinality between entities A and X indicates that for each entity A, there is either one or zero entity X. A 1:1 cardinality between entities A and X indicates that for each entity A, there is exactly one entity X. A 1:n cardinality between entities A and X indicates that for each entity A, there are one or more entity Xs. A 1:cn cardinality between entities A and X indicates that for each entity A, there are any number of entity Xs (i.e., 0 through n Xs for each A).

Figure 2B:
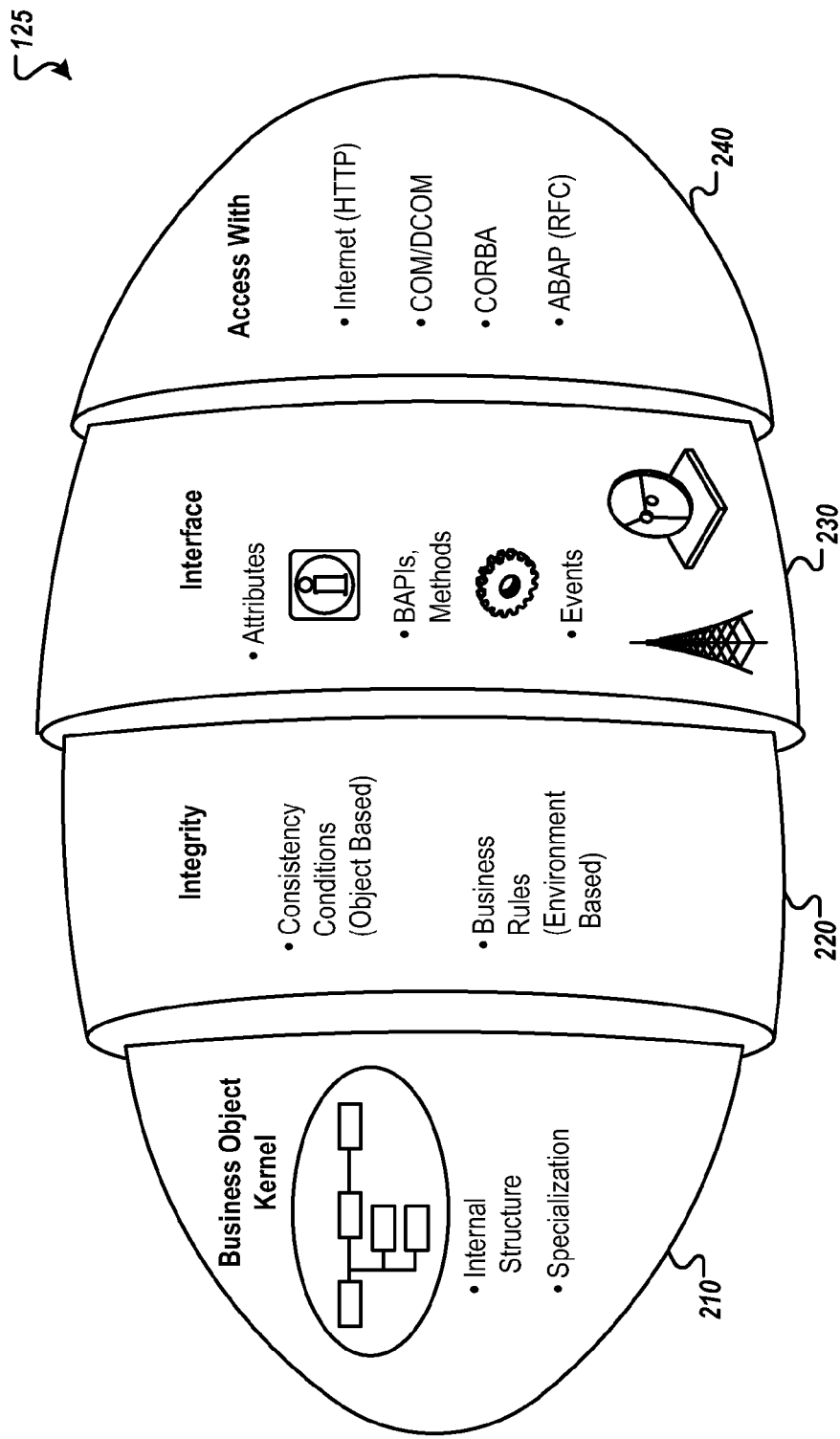
FIG. 2B depicts an example graphical representation of one of the business objects.

FIG. 2B provides a graphical representation of a business object 102. As shown, an innermost layer or kernel 210 of the business object 102 may represent the business object's inherent data. For example, in a business object 102 representing an employee, inherent data may include, for example, an employee's name, age, status, position, address, etc. A second layer 220 may be considered the business object's logic. Thus, the layer 220 includes the rules for consistently embedding the business object in a system environment as well as constraints defining values and domains applicable to the business object 102. For example, one such constraint may limit sale of an item only to a customer with whom a company has a business relationship. A third layer 230 includes validation options for accessing the business object. For example, the third layer 230 defines the business object's interface that may be interfaced by other business objects or applications. A fourth layer 240 is the access layer that defines technologies that may externally access the business object.

Accordingly, the third layer 230 separates the inherent data of the first layer 210 and the technologies used to access the inherent data. As a result of the described structure, the business object 102 reveals only an interface that includes a set of clearly defined methods. Thus, applications may only access the business object via those defined methods. An application wanting access to the business object and the data associated therewith must include the information or data required to execute the clearly defined methods of the business object's interface. The clearly defined methods of the business object's interface represent the business object's behavior. That is, when the methods are executed, the methods may change the business object's data. Therefore, an application may utilize any business object by providing the required information or data without having any concern for the details related to the internal operation of the business object.

Returning to the architectural elements of the service-oriented application 124, process components are architectural elements that are software packages realizing a business process and generally exposing its functionality as services. Examples of process components are: due item processing, sales order processing, and purchase order processing. The functionality includes the ability to perform all or parts of particular kinds of business transactions. It acts as a reuse element in different integration scenarios and is often a modeling entity. A process component contains one or more semantically related business objects. Any business object belongs to no more than one process component.

Process components are mainly modeling entities to group business objects, bundle web service calls to message choreographies, and collect configuration settings. For configuration, process components are used to assign business process variant types for business configuration and for addressing of messages. As such, process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also optionally include the service interface, which may be referred to simply as an interface. An interface is a named group of operations. Each operation belongs to exactly one interface. An interface belongs to exactly one process component. A process component might implement multiple interfaces. In some implementations, an interface will have only inbound or outbound operations, but not a mixture of both. One interface can include both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

An outbound process agent will generally perform some processing of the data of the business object instance whose change triggered the agent or caused the agent to be called. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture often requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

Figure 3A:
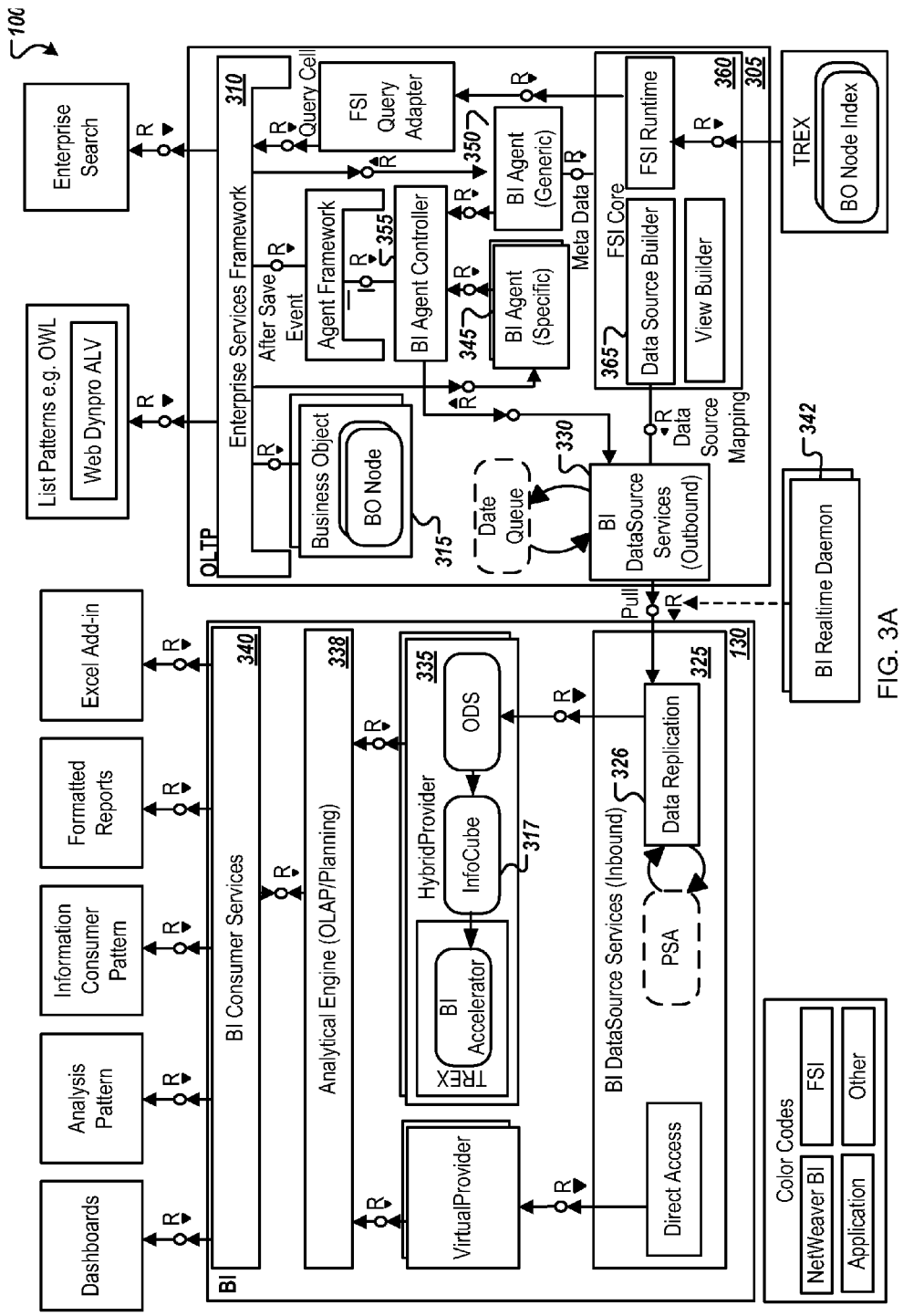
FIG. 3A depicts an example enterprise software environment including a reporting module and online transaction processing system.

FIG. 3A illustrates an example implementation of a reporting module 130 for use in connection with an enterprise software environment 100. Certain components of the enterprise software environment 100 can be grouped in an online transaction processing (OLTP) system 305. Among these components, an enterprise services framework 310 can be provided, to facilitate the applications and business services provided to customers and users of the enterprise software environment 100. The framework 310 can employ an object-oriented architecture based on a set of data objects 315, such as business data objects. As described in more detail below, each data object 315 has one or more nodes, used in defining relationships between data objects as well as fields within a data object 315. Data objects 315 can be used to store data relating to the services and applications provided by the enterprise services framework 310, as well as transactions carried out by these services. In some instances, however, data elements storing such transactional data, are centrally managed and located within the OLTP level 305 of the enterprise software environment 100. Other modules, such as reporting module 130, may not be able to directly access and process data from the data objects. This can involve the replication of data, from the data objects, for use and manipulation by and within the reporting module 130. Additionally, some instances of reporting module 130 may only be capable of processing transactional data passed to it in a compatible format. In either instance, query data structures can be built for use by the reporting module, based on data stored and managed within data objects 315 of the system 100, to translate data object data from the OLTP environment 405 to the reporting environment 130.

Figure 3B:
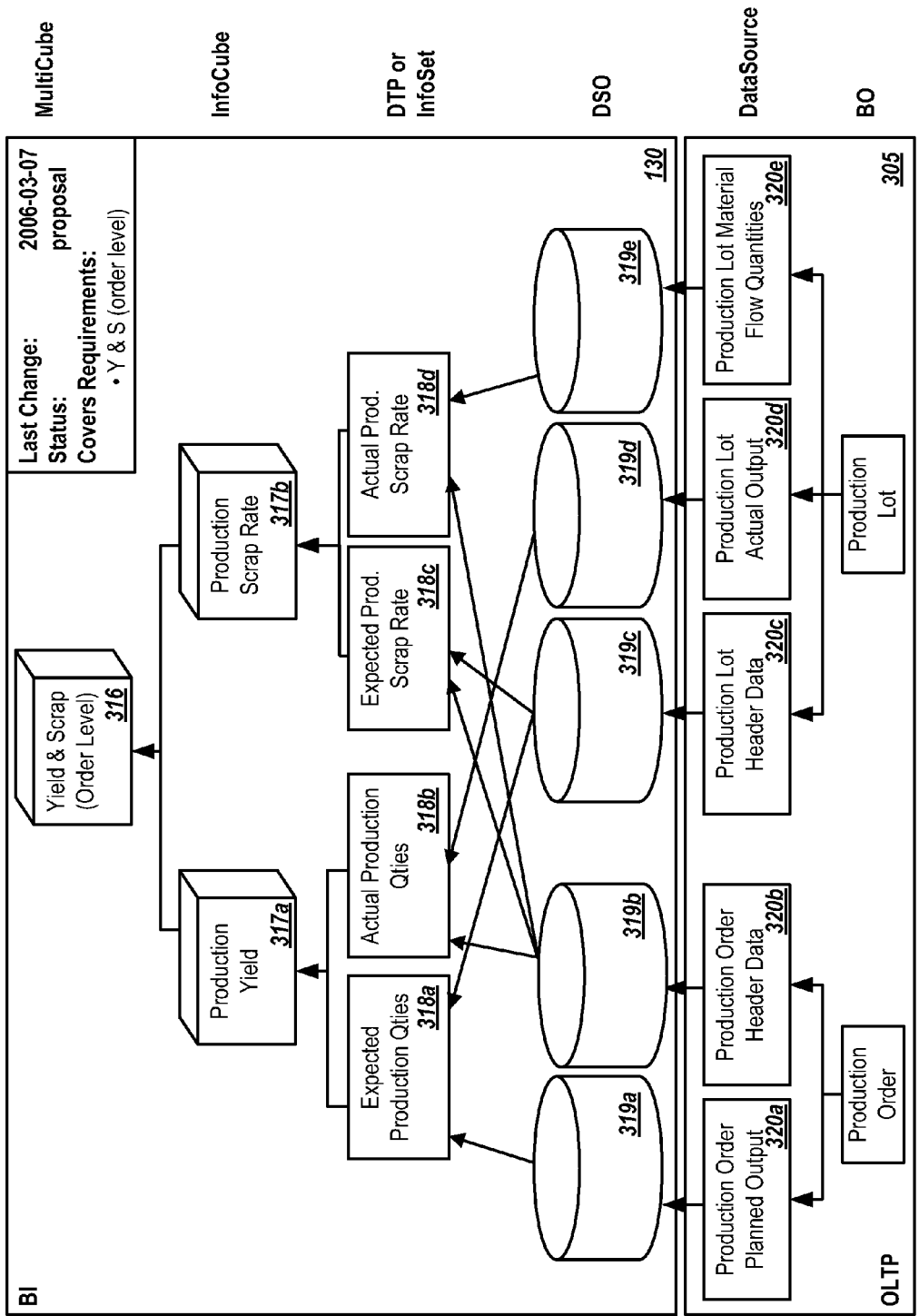
FIG. 3B depicts an example data flow from an online transaction processing system layer to a reporting module layer using data extraction structures.

As illustrated in FIG. 3B, data extraction structures can form the basis for more complex data structures for use within the reporting environment 130. An extraction structure is a data element capable of being used within the reporting environment. The concepts in the disclosure can also be implemented in connection with other structured data elements for use in other enterprise software system modules. In the example of FIG. 3B, it has been determined that it would be useful to synthesize data from two distinct business data objects, ProductionOrder 315a and ProductionLot 315b, into a single reporting query. This single reporting query can be based on a single data structure constructed by reporting environment 130, MultiCube 316, detailing yield and scrap at the order level. The MultiCube data structure 316 could, in turn, be the product of melding other data structures (317a, 317b, 318a-d) also generated from data query objects 320a-e based on business objects 315a and 315b. The reporting data structures 316-318 are capable of use by the reporting module to generate reports and other analytics results. Each reporting data structure can upload the business object data from storage objects 319a-e. Data stored in storage objects 319a-e correspond to the business object data mapped by data extraction structures 320a-e.

A data query object 320 can be an entity capable for use in extracting data from the OLTP system to the reporting system 130. In extracting, duplicate data is passed from the business objects 315 at the OLTP level to the query data stores 319 at the reporting level 130. Passing data from business objects in the OLTP system to the reporting system 130 in this manner, allows for robust reporting and analytics manipulations of data object data, while securing the integrity of the original data objects used by the enterprise services framework of the system 100. Additionally, as business objects 315 can take on hierarchical, and other complex internal data structures, the data query object 320 can provide a mechanism for translating data into a format compatible or more convenient for use with the analytics functionality of the reporting module 130. For example, data query objects 320 can flatten hierarchical business object data into a set of flat data fields, more amenable to reporting tasks.

Returning to FIG. 3A, inbound 325 and outbound 330 query services modules can be provided at the reporting module 130 and OLTP system 305, respectively, to handle transactions relating to data query objects 320. For example, outbound query service module 330 can extract, or copy, data based on the data query object mapping, from the corresponding business object 315. This data can be passed to inbound query services module 325 to build one or more reporting data stores 319, for example, using a data replication module 326. Data storage object 319 can be managed in connection with a data provider module 335, capable of using the data storage object to build further reporting data structures 317 for use by analytics engine 338 and reporting services framework 340 to provide various analytics, reporting, and planning services to system 100 users.

As data objects 315 are used within the enterprise services framework 310, data within the data objects can be modified, added, and deleted. These delta changes to data object data can be forwarded to the reporting module 130, to ensure that these changes are reflected within corresponding data structures used by the reporting module 130. A realtime daemon 342 can be used in conjunction with communicating delta changes to the reporting module, as well as pushing and/or pulling data updates from the underlying data objects 315.

In some instances, loading of delta data from data objects 315, in accordance with data extraction structures 320, can be managed using a data mapping agent 345, 350. The data mapping agent can also be employed to initially load data, according to the definition of the data extraction structure 320, for replication of the data at the reporting module 130. The mapping agent 345, 350 maps fields as outlined by the data extraction structures 320 to fields of corresponding nodes of the business object 315, functioning to handle the passing of data from the data object 315 to the extraction structure 320 and other reporting data structures. Effectively, the mapping agent 345, 350 serves as the functional bridge between the data extraction structure 320 and its corresponding data object 315, and there by a bridge between the enterprise services framework 310 and the reporting module 130.

In some instances, each data mapping agent 345, 350 performs essentially three primary tasks. First, the data mapping agent 345, 350 performs an initial load of the data to the reporting module. The mapping agent 345, 350 can perform the initial load in response to a call from the outbound query services module 330 (which could be in response to a call from the inbound query services module 325). A call for an initial data load can occur when the reporting module 130 initially attempts to access data from data object nodes included in a extraction structure's 320 definition in connection with a reporting or analytics task performed by the reporting module 130. The mapping agent 345, 350 can perform the load by accessing the definition of its corresponding data extraction structure 320 to identify the business object 315 nodes and node fields included in the definition to ascertain what data, from the business object 315, is to be passed for replication at the reporting module 130. Second, the mapping agent can handle the delivery of delta records to the reporting module 130. When business object nodes or node fields, included in the mapping agent's 345, 350 registered extraction structure 320 definition, are altered, these changes can be forwarded, automatically, to the reporting module by the mapping agent 345, 350. This can involve the re-loading of all data in the extraction structure definition, or a filtered set of only that data affected by the alterations.

In some instances, a mapping agent controller 355 can also be provided for managing communication between mapping agents 345, 350 as well as aiding mapping agent processes. For example, in some instances a data extraction structure 320 must first be registered to a mapping agent 345, 350. The mapping agent 345 can be specifically designed and constructed for use with the individual data extraction structure, or, in other instances, be a generic mapping agent 350, capable of being used by many, distinct, data extraction structures 320 used by the reporting module 130. A mapping agent controller 355 can register the extraction structure 320 to the appropriate mapping agent and remove registrations when appropriate. Additionally, during runtime, when data is to be initial loaded according to a data extraction structure 320, a call is made to the mapping agent controller 355. The mapping agent controller 355 can identify the data extraction structure 320 and find the mapping agent 345, 350 registered to the extraction structure 320. The mapping agent controller 355 can also serve as an intermediary for communication between the data extraction structure 320 and mapping agent 345, 350 passing data from the mapping agent 345, 350 to the outbound query service module 330 during an initial load of data or delta load, used to update reporting data structures in accordance with a change at the business object 315 level.

The mapping agent framework of the OLTP system can provide for each mapping agent 345, 350 to have a dedicated instance of the mapping agent controller 355. A controller instance can receive change notifications at the key level for all data object node instances, changed within an enterprise services framework transaction, included in the definition of the extraction structure to which the controller instance's mapping agent is registered. Additionally, the controller can function as a filter, filtering out the keys of data object node instances not contained in the extraction structure's 320 definition or affected by changes resulting in a delta upload. The agent controller 355 can also forward delta notifications to the mapping agent from the enterprise services framework 310. These delta notifications may be triggered by the business objects 315 themselves, or by the enterprise services framework 310 in response to an after save event, detecting changes to object node data included in a extraction structure 320 and alerting the mapping controller 355.

Also included within the OLTP system is a query infrastructure core 360. The query infrastructure 360 provides tools for use in query requests involving data object 315 and services of the OLTP system 305. The query infrastructure 360 interfaces both with the reporting module 130 (through the query service module 330), as well as the enterprise services framework 310. Among the tools provided, the query infrastructure 360 can include a data extraction structure builder 365. The extraction structure builder 365 can be used to build extraction structures 320 from business objects 315 within the system 100. In some instances, a extraction structure 320 can only be built from a single business object 315. The extraction structure shell can first be created by the reporting module 130 or extraction structure builder 365 automatically in response to a query request calling for certain data. In other implementations, the extraction structure shell can be created as part of the query request. In instances where extraction structures 320 can draw from only a single data object 315, the building of a extraction structure 320 can only proceed upon identification of the relevant data object (and underlying data) needed to be extracted using the extraction structure 320.

Building a extraction structure 320 can include constructing a extraction structure definition. A extraction structure definition can outline the data object nodes and node fields to be forwarded to the reporting module 130 using the data extraction structure. Additionally, the extraction structure definition can outline, not only the data object nodes and node fields to be included, but also relationships between the data object nodes and node fields. The extraction structure can thereby serve as a map for the mapping agent, detailing the data to be loaded for replication at the reporting module as well as the location of the data.

Figure 4A:
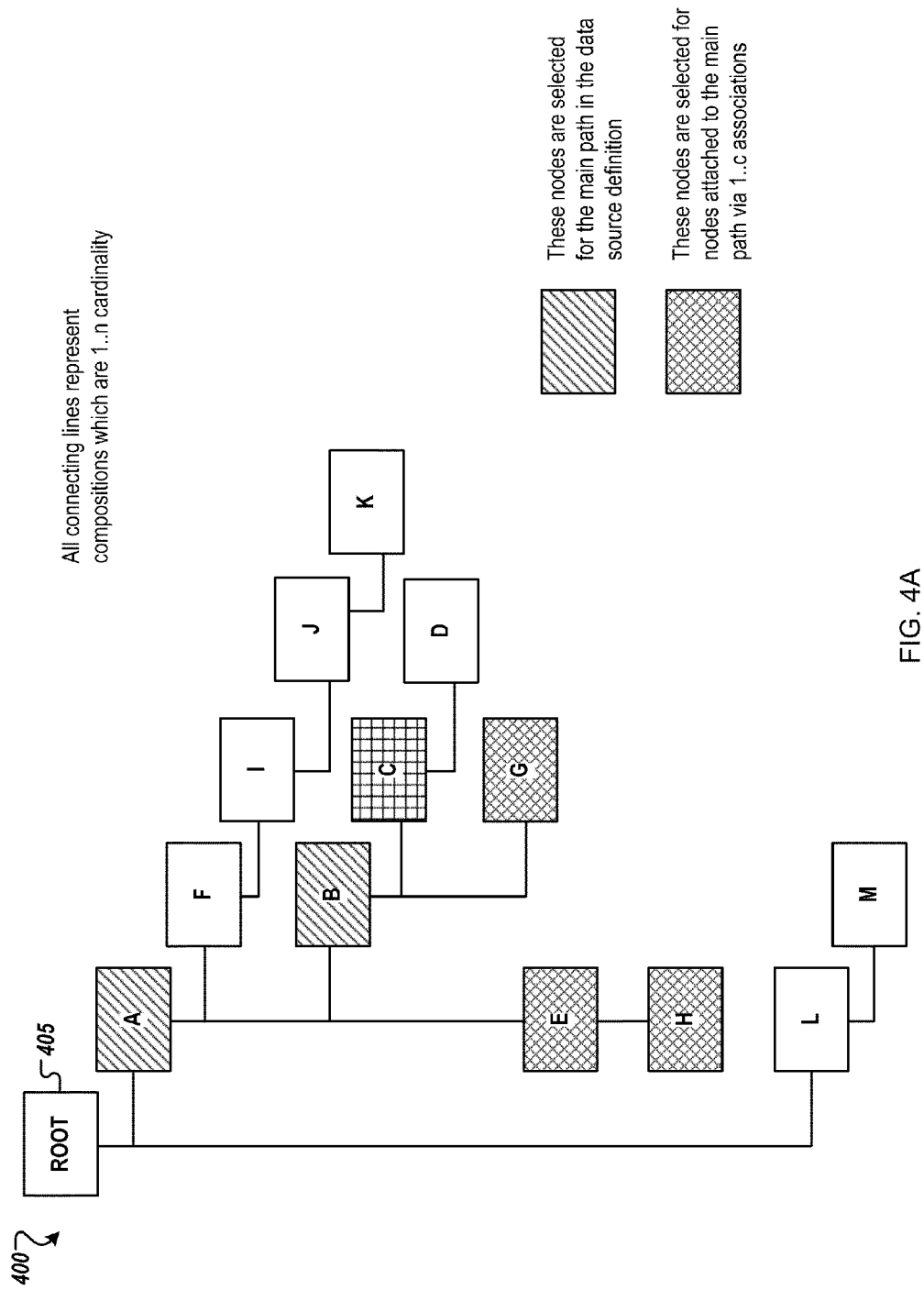
FIG. 4A depicts the hierarchical data structure of an example data object.

FIG. 4A illustrates the hierarchal structure of nodes within an example business object 400. In this example, business object 400 has fourteen nodes organized in hierarchical tree structure. Each node can have fields. For example, business object 400 may be a business object related to customers. Individual nodes within a CustomerContact business object could include, for instance, a FirstName node, detailing the first names of all past customers of a given enterprise, LastName node, EmailContact node, Address node, etc. For each customer, fields can exist in each of the nodes, pertaining to the customer's name, contact information, etc. One node in a business object 400 can be designated as the 405 of the business object. A business object 400 can have one or more root nodes, depending on the structure of the business object 400. Each node in the business object 400 is related to the root node by a path. For example, Node J has path including Nodes I, F, and A, in that order. Node E has a path including Node A, while Node L has a direct path to the root node 405.

A extraction structure definition can be built based on paths in a hierarchical business object node tree. Continuing with the example of business object 400, a particular extraction structure definition can be developed. In this example, the query is to include data from fields in nodes A, B, C, E, G, and H. The hierarchical relationship between these fields can be exploited to build a extraction structure definition identifying and linking the locations of each of these nodes. The core of such a extraction structure definition is the Main Path. The Main Path is a subsection of the business object tree. To define the Main Path, all the nodes that are to contribute fields to the query extraction structure need to be identified. One of these nodes is to be selected defining the query extract structure instance. This particular node is referred to as the anchor node. The anchor node will be the lowest node of the Main Path on the business object node tree that may contribute to the query extract structure. In the example of FIG. 4A, Node C is the anchor node. The anchor node is unique to the extraction structure definition and defines the granularity of extraction structure instances.

To further define the Main Path, nodes are identified in the Main Path by moving "up" the tree, following the child-to-parent relationship of the nodes, until the last node that contributes fields or has dependent nodes that contribute fields is reached. This last node is the top node. In other examples, the top node can be the root node. Additionally, in some instances, the top node and anchor node will be the same node. As Node C is the anchor node, moving up the tree includes Nodes B, A, and the root node 405. In this example, both Nodes A and B contribute data fields to be included in the extraction structure definition while the root node does not. In that Node A is the node on the path closest to the root node and contributing a field to the definition, Node A is the top node. As a result, Node B, positioned on the path between Nodes A and C, is also included in the Main Path, the Main Path in this example including Nodes A, B, and C.

Apart from the nodes along the main path, other nodes may contribute to the extraction structure definition. As seen in the tree hierarchy illustrated in FIG. 4A, a number of other nodes exist in the business object node hierarchy 400 not included in the Main Path. Additionally, in this example, Nodes E, G, and H also contribute data to the extraction structure definition despite not being included in the Main Path. Building the extraction structure definition, according to the hierarchy tree technique described, requires further that nodes contributing to the extraction structure definition be linked to the Main Path. In some instances, the contributing nodes not in the Main Path must nonetheless be associated with nodes of the Main Path. In these cases, the association between "associated" nodes and Main Path node can require a 1 . . . c cardinality between the associated and Main Path node. The nodes of the Main Path are related with a 1 . . . n cardinality between parent and child nodes. If associated nodes are related to a Main Path node with a 1 . . . c cardinality, these nodes can be included in the definition.

In some instances, more than one association may exist between an associated node and a node on the main path. Multiple associations can allow developers to choose between more than one association path to include node fields needed for a particular query extract structure definition. In any event, using the tree hierarchy definition building technique, each relationship in the Main Path and to the associated nodes must be defined. In the case of the Main Path, no further definition is required, as these nodes are related by virtue of their parent-child relationships. In some instances, each node includes, within its node profile, a parent-child ID, identifying the node's parent. Parent-child ID data can be used to define relationships between nodes in the Main Path. For the associated nodes, the path between two nodes must be selected from the list of available modeled associations. It may be required, however, that this path be reduced to a cardinality of 1 . . . c. In some cases, reducing cardinality can be accomplished using a filtered association by declaring a filter parameter value. For example, if the data object modeling does not lead to a 1 . . . c relationship in an association relationship, the associated node can still be used in the extraction structure definition, by defining an association between the associated node and another node that reduces the relationship to 1 . . . c. This associated can be a filter association as defined by the enterprise service framework. This filter condition must be entered in the appropriate field of the corresponding execution structure for use by the appropriate mapping agent to navigate to the filtered node of an instance level.

Additionally, in some instances, more than one path may be declared between two nodes. In such a case one of the paths is to be chosen for each query extraction structure field. As an example, a main path may include a node named "HEADER." The HEADER node is related to an associated node in the business object named "PARTY," in a 1 . . . n relationship. In this example, a second PARTY node is provided linked to the HEADER node and also containing the desired fields for inclusion in the definition. To reduce the cardinality, two associations can be defined: "SoldToParty" and "ShippedToParty." Fields from both these associated Parties may be included in the execution structure. However, for each association a path must be declared.

Figure 4B:
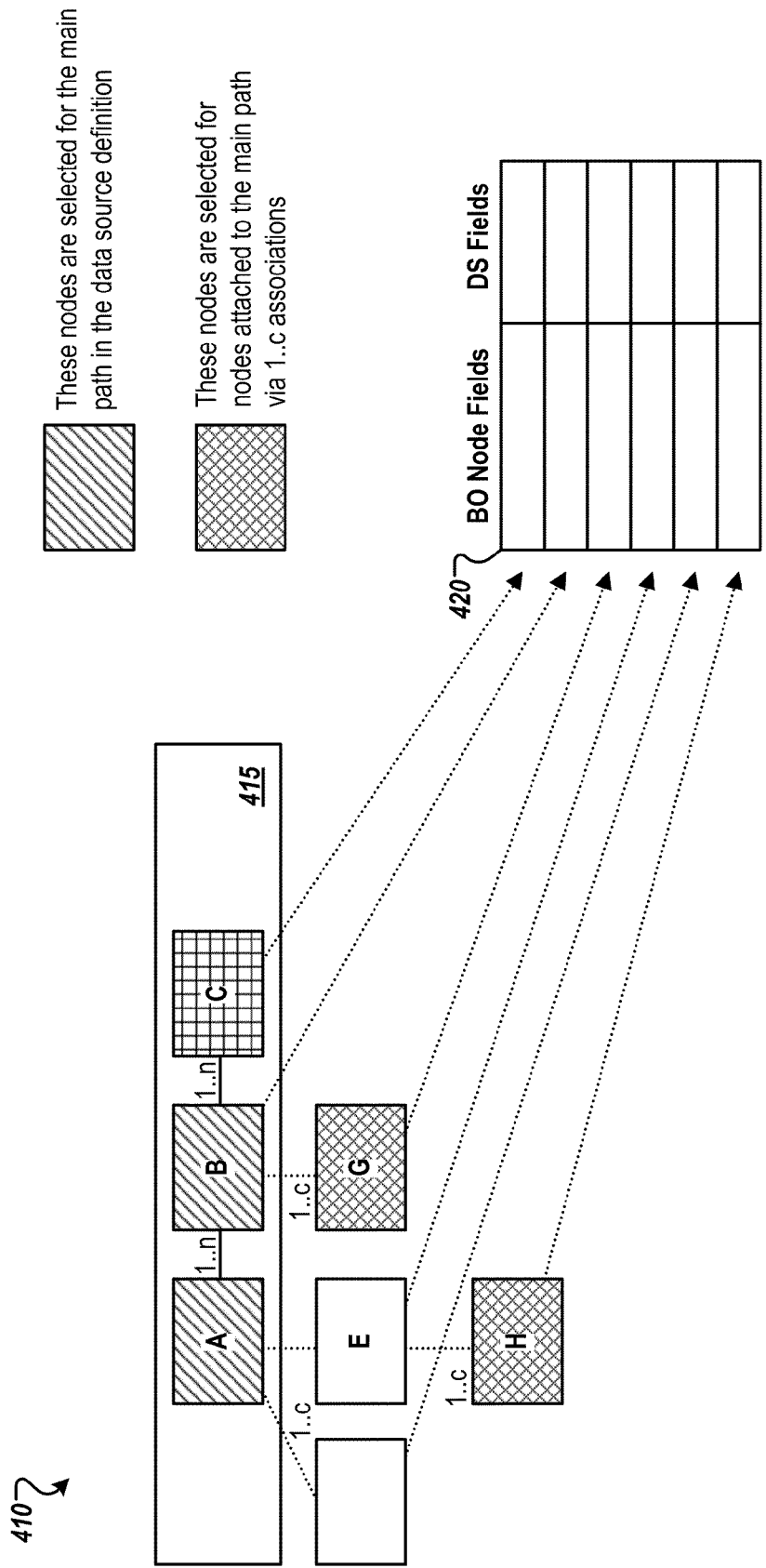
FIG. 4B depicts an extraction structure definition based on the example data object of FIG. 4A.

Once all of the desired node fields have been mapped using a hierarchy tree definition technique, the definition can be completed by further mapping the node fields to corresponding fields of the query execution structure. Completion of the extraction structure definition can also result in the generation of the completed extraction structure. FIG. 4B illustrates the section 410 of business object's 400 node hierarchy that is to be included in the extraction structure definition. As shown in FIG. 4B, Nodes A, B, C are illustrated occupying a top horizontal row of nodes 415, representing the Main Path. Nodes E, G, and H branch off from the Main Path, but are also included in the extraction structure definition. As shown in FIG. 4B, fields from these nodes can be mapped onto fields 420 of the extraction structure.

In some cases, it will not be necessary to map all node fields to extraction structure fields, since some extraction structure fields may be filled in an application-specific callback class. In addition, business object node fields may reserved for the input parameter structure of the application callback class and not mapped directly to extraction structure fields. In the case of an extraction structure field reserved for a callback class, these fields can be left blank. An application specific callback class may be defined by the developer to handle application-specific mapping steps. For example, during runtime, the mapping agent maps the node fields to the extraction structure fields. After the agent has filled the extraction structure fields, the input parameter structure can be passed to the callback class for modification. The result returned by the callback class is then passed to the a query service module for further handling and updating of the fields.

Figure 4C:
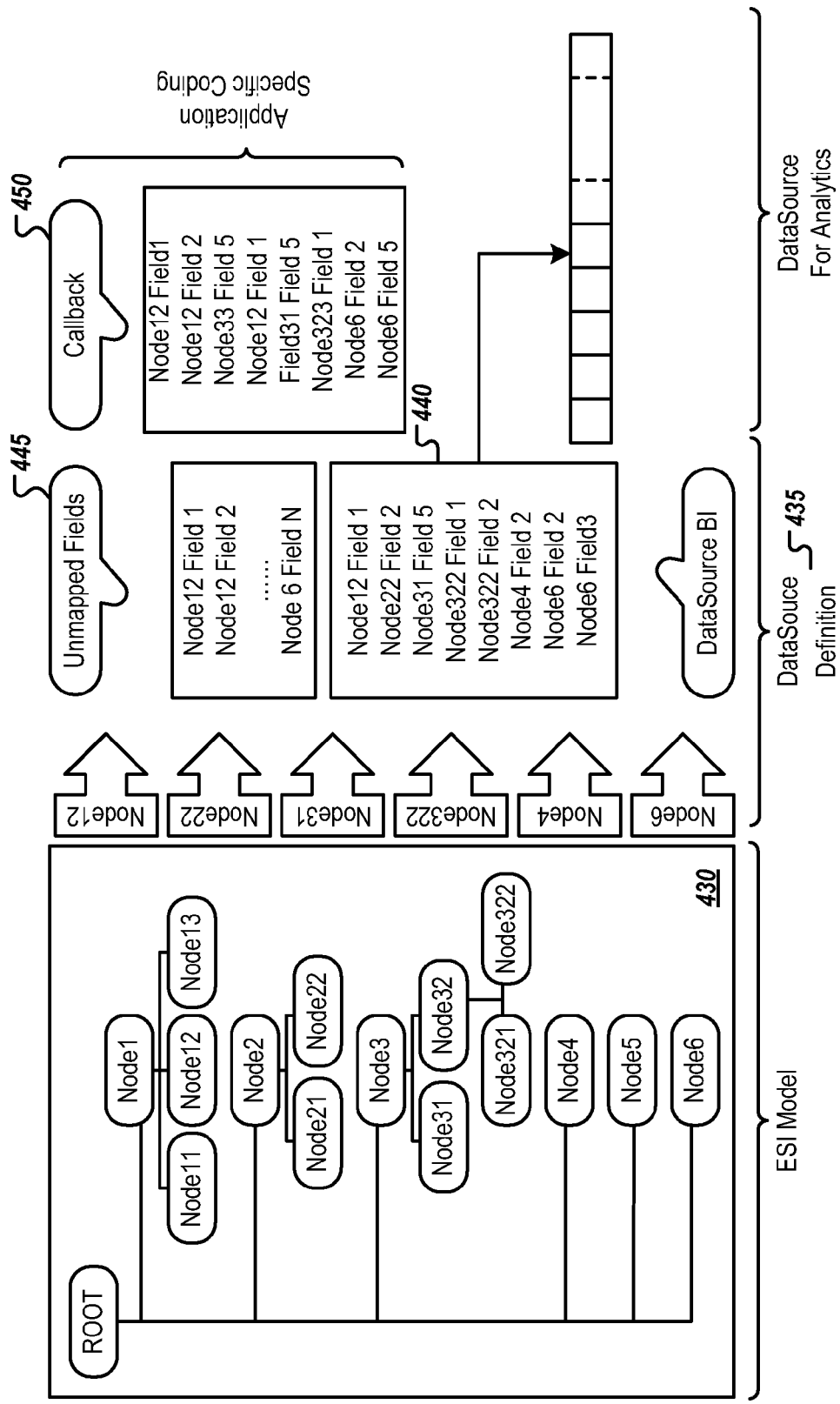
FIG. 4C depicts another example of hierarchically-organized data object and corresponding extraction structure definition.

While FIGS. 4A and 4B illustrated the use of a tree hierarchy approach to building a extraction structure definition, other techniques can be used. For example, as illustrated in FIG. 4C, some object node hierarchies may not lend themselves to the construction of clean, hierarchical extraction structure definitions. In FIG. 4C, node hierarchy 430 includes six nodes, 2, 22, 31, 322, 4, and 6, whose fields are desired to be included in a extraction structure definition 435. Instead of defining a Main Path and associated nodes, the definition 435 can be developed simply by mapping the desired fields directly to the extraction structure fields, in an ad hoc manner. In other examples, all of the fields of the business object nodes 430 can be included in the definition, the fields grouped in two categories, extraction structure fields 440 and unmapped fields 445. As in preceding example, any fields to be included in a callback class 450 can also be reserved ad hoc, for inclusion in a input parameter structure.

In some implementations, ad hoc extraction structure definitions and their resultant extraction structures, such as in the example of FIG. 4C, will require a dedicated, extraction structure-specific mapping agent, such as the mapping agents 345 described in connection with FIG. 3A. Where a query extraction structure is built in an ad hoc manner, or using some other custom technique to achieve the desired extraction structure definition, a generic mapping agent 350 may not be available to handle the customized query extraction structure. However, in other query extraction structures built using a common definition building technique, such as the tree hierarchy building technique described in connection with FIGS. 4A and 4B, a common, generic mapping agent may be employed capable of handling extraction structure data loading for any extraction structure created using the common definition building scheme. While a common definition building scheme may not provide full customizability, a definition building scheme, such as the tree hierarchy building technique, can be highly flexible and succeed in building a large percentage of the potential extraction structures to be used in connection with a enterprise software systems analytics functionality.

In that some systems implement hundreds of extraction structures in connection with the provided analytics functionality, common definition building schemes and generic mapping agents can ease extensibility, maintenance, and development of additional analytics queries, allowing developer man-hours, otherwise dedicated to crafting customized mapping agents, to be diverted to other activities. A generic approach reduces the time a developer needs to define the extraction structure mapping. Apart from application-specific callbacks, there may be no need for the developer to implement any coding. This greatly reduces implementation and testing time while allowing easy extensibility. Furthermore, the model based approach is thus carried into the reporting procedure. In enterprise software systems employing a model based platform, for example, as described above in connection with FIG. 1, it can be advantageous to extend the model-based approach to the system's reporting functionality. Definition building schemes can be developed that take advantage of the model-based framework of the system, including data structures, such as business objects. The models underlying the system, for example the business object model, and modeling between data objects, can be exploited in building extraction structure definitions, the hierarchy tree definition building scheme being one example.

The building of a extraction structure definition, during the design-time development of the extraction structure, results in the creation of a new meta entity for use with extraction structures. This metadata, provided in the extraction structure definition, effectively provides instructions to mapping agents for correctly mapping the data fields of the requested business object nodes for extraction with the extraction structures. In some implementations, application specific logic can also be defined within the extraction structure definition, further enhancing the usefulness of the extraction structure definition.

Figure 5:
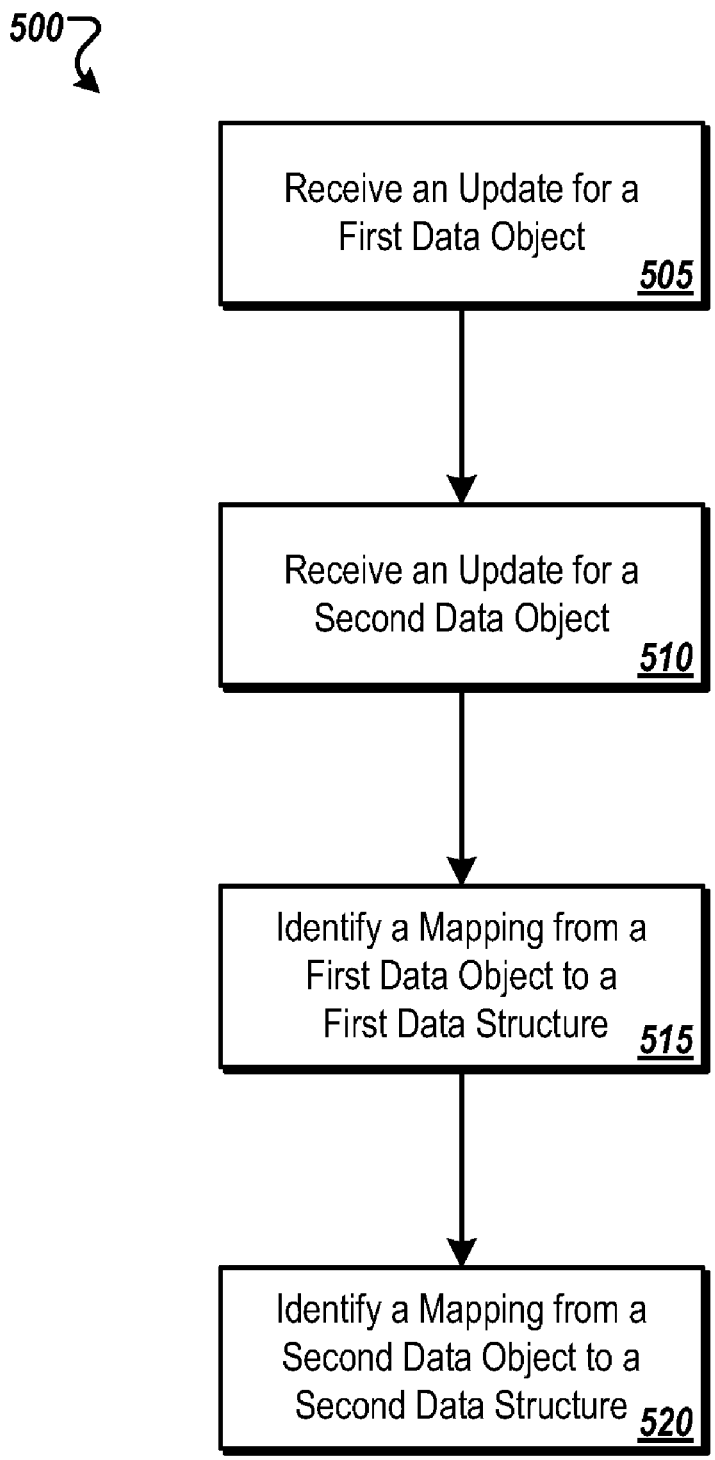
FIG. 5 illustrates a flowchart of an example technique for automatically preparing data from a data object used in an enterprise software application using a mapping agent in accordance with one embodiment of the present disclosure.

FIG. 5 is a flowchart of an example technique 500 for automatically preparing data from a data object used in an enterprise software application. This technique 500 may be described in terms of the software environment 100, but it should be understood that any other suitable system or environment may also be used to implement or perform the process. In short, this (or another similar) technique can be accomplished by a computing device reading corresponding instructions—encoded on tangible machine readable media—for performing the described steps. At step 505 an update is received for a first data object. Either in concert with, or at some other time as the update for first data object is received at 505, an update can be received 510 for a second data object. Each of the first and second data objects can include hierarchical data, each object having at least one node and associated with a service-oriented enterprise software application. A mapping can be identified 515 from the first data object to a first structured data element using a first mapping agent. In some instances, the first structured data element can be used in connection with extracting data for use with analytics functionality. An example of such a structured data element can include the extraction structure described in connection with the examples above. Additionally, a mapping can also be identified 520 from a second data object to a second structured data element using the same first mapping agent. In other words, the first mapping agent can be configured to identify mapping from one of a plurality of data objects to a corresponding structured data element.

In an example system employing tree hierarchy-based extraction structure definition building, a generic mapping agent can be implemented, configured to process and map metadata contained in the extraction structure definition and outlining the mapping of node data fields to fields of an extraction structure. When called to assist in providing an initial load or delta load of an extraction structure, the generic mapping agent can exploit the common definition-building scheme, deploying a common algorithm when processing load requests related to any extraction structure definition developed using the corresponding tree-hierarchy-type convention. The generic algorithm can be used to return referenced object node field data to extraction structure service modules operating to pass and replicate data to the reporting module. Generally, for tree-hierarchy definitions, a tree-walker algorithm can be employed by the registered generic mapping agent. To "treewalk" the mapping agent first identifies the top node of the node tree (or the highest updated node in a delta load) and creates an internal table corresponding to the mapped node fields in the node. The mapping agent repeats the creation of internal tables for each node down the Main Path until reaching the anchor node. An internal table is also created for the anchor node. The number of instances in the anchor node internal table define how many instances will exist in the extraction structure. Internal tables are also created for each of the associated nodes. In that each node in the definition is related to another node in the definition, the mapping agent can easily identify the next or remaining nodes to be loaded from the extraction structure definition metadata outlining these inter-nodal relationships. Using the internal tables, the fields of the extraction structure can then be filled using the corresponding internal tables of the nodes.

Figure 6:
FIG. 6 depicts an example population of fields in a data extraction structure and extraction of data to the structure based on the hierarchical structure of a data object in accordance with one embodiment of the present disclosure.

FIG. 6 illustrates an example set 600 of node internal tables 605, 610, 615, 620, 625, 630 for Nodes A, B, C, E, G, and H respectively including the node fields to be included in a extraction structure definition, and thereby the fields of an extraction structure 635. The example definition 600 in this example exhibits a hierarchy structure comparable to the example of FIG. 4 for convenience, although extraction structure definitions can be of potentially limitless variety while still conforming to the tree-based scheme. As shown, extraction structure fields are to be populated with data from corresponding node fields. The fields of extraction structure 635 have already been filled based on the internal tables 605-630 of the nodes generated at runtime. The extraction structure fields can be filled using an enterprise software framework RETRIEVE call. For example, node instance A, belonging to Node B, has been filled based on the mapping, defined in the generated internal table 610, to field 3 of the extraction structure 635. Some nodes have multiple instances, such as Nodes A, C, and E (with node instances B, D, E, G, and I, identified by NodeID). The NodeID identifies the node instance, not the node itself. In this example, extraction structure fields are filled by instances of the nodes. In that anchor Node C has two instances D, E, extraction structure fields must similarly be filled with two instances. For instance, Node G contributes node instance F to extraction structure field 7. Because there are two total instances, as defined by the anchor node, field 7 is filled with two, identical instances of F. Each of the remaining fields in the extraction structure is similarly filled.

Continuing with the example of FIG. 6, in the case of an initial load a SELECT_ALL call is made returning all root nodes of the business object. In this case Root Node (not pictures) as a single node instance (NodeID ZZ). Accordingly, the root node is the parent of Node A 605 and generic mapping agent, using the treewalker algorithm, first navigates to node Node A. In general, n instances of Node A are returned. For each of these instances, the extraction structure must be calculated. Using RETRIEVE calls all main path node internal tables are filled. In this example, proceeding down the Main Path of Nodes A, B, and C, this will result in m instances of Node B 610 for each instance of Node A 605 and $p_i$ instances of anchor Node C 615 (where i is the number of instances of Node B). In total, the internal table for Node A will include n instances, the internal table of Node B will include n*m instances, and the internal table of Node C n*m*$\Sigma$ $p_i$ instances. In the illustrated example, this results in two instances of Node C (2×1×1). The internal tables of the associated nodes must be filled using the appropriate RETRIEVE_BY_ASSOCIATION calls. The association which is called depends on the path defined in the definition meta data. For associated Nodes E and H, in this example, the internal table contains n instances each (in that they are associated through Node A), while the table for Node G, associated through Node B, includes n*m instances.

In a delta load, the mapping agent identifies the highest node in the hierarchy. In the case of an update call to a node along the Main Path, the instance list is reduced at that point. For example, an update may occur at Node B 610. Using the parent-child relationship, the generic mapping agent, using the treewalker algorithm, navigates to the top updated node, in this case Node B. Here, one instance is retrieved. Using the RETRIEVE call, the instances of Node B are retrieved. In general this will be m instances. Since the update was on NB, only the updated node is kept in an internal table. From here the TreeWalker navigates to NC using the 1 instance in the table for Node B. The table for Node C will then have p table nodes, or instances. Accordingly, the associated nodes Nodes E, H, and G are also retrieved (by association) also yielding one instance each. In other examples, where the update is on another node, the mapping agent must navigate similarly, taking into account that only the Main Path must be reduced at the point where the update has occurred. As with an initial load, when all desired internal tables are filled, the extraction structure fields can then be filled.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for automatically preparing data from a data object used in an enterprise software application, the method comprising:
   receiving updates for first and second data objects, the data objects each comprising hierarchical data with at least one node and associated with a service-oriented enterprise software application;
   mapping from the first data object to a first structured data element using a first mapping agent;
   creating, by the first mapping agent, at least one table corresponding to the nodes of the hierarchical data of the first data object, the at least one table including information from one or more fields of the node and facilitating extraction of data from the first data object based on the identified mapping, the at least one table including fields populated with data from corresponding node fields; and
   mapping from the second data object to a second structured data element using the first mapping agent, the mapping from both the first and second data objects to first and second respective structured data elements based on the at least one table and including:
      identifying a top node in the hierarchical data of the data object, and
      progressing from the top node of the hierarchical data to an anchor node of the hierarchical data, a relationship between the top node and anchor node defining a main path of progression for mapping of the respective data object.

2. The method of claim 1 further comprising loading extracting data, using the first mapping agent, from at least one of the first or second data objects based on the mapping from the data object to the respective structured data element.

3. The method of claim 2, wherein the extracted data is for use in connection with the respective structured data element.

4. The method of claim 2, wherein the extraction is an initial data extraction for all data in the mapping.

5. The method of claim 2, wherein at least one of the received updates is received from an event manager associated with the service-oriented enterprise software application.

6. The method of claim 5, wherein data is extracted in accordance with a received update to reflect the update in corresponding structured data elements.

7. The method of claim 1, wherein the first structured data element is adapted for use in connection with analytics functionality of a service-oriented enterprise software system.

8. The method of claim 7, wherein the first data object is decoupled from the analytics functionality.

9. The method of claim 1, wherein the anchor node at least partially defines how many data instances are to be mapped to the structured data element.

10. The method of claim 1, wherein mapping further comprises identifying nodes not on the main path of progression but otherwise associated with at least one node on the main path.

11. The method of claim 1, wherein the mapping is based on a metadata definition associated with the structured data element.

12. The method of claim 11, wherein the metadata definition is created by a user prior to the mapping.

13. The method of claim 11, wherein the metadata definition identifies selected fields from the hierarchical data and defines relationships between the fields.

14. A computer program product comprising application software encoded on a tangible, non-transitory machine-readable information medium, the application software being structured as process components interacting with each other through service interfaces, the software comprising:

an update process component that is responsible for receiving updates for first and second data objects used in an enterprise software environment, wherein the data objects each comprise hierarchical data with at least one node;

a mapping process component that is responsible for automatically identifying a first mapping from the first data object to a first structured data element and automatically identifying a second mapping from the second data object to a second structured data element, the mapping from both the first and second data objects to first and second respective structured data elements including:

identifying a top node in the hierarchical data of the data object; and progressing from the top node of the hierarchical data to an anchor node of the hierarchical data, a relationship between the top node and anchor node defining a main path of progression for mapping of the respective data object; and a data extraction process component that is responsible for loading data from the first data object to the first structured data element based on the first mapping and loading data from the second data object to the second structured data element based on the second mapping; and wherein the mapping process component creates at least one table corresponding to each of the at least one node of the hierarchical data of the first data object, the at least one table including information from one or more fields of the at least one node and facilitating extraction of data from the first data object based on the identified first mapping, the at least one table including fields populated with data from corresponding node fields, the data including at least one instance of each top node and at least one instance of each anchor node for each instance of each top node.

15. The product of claim 14, wherein the mapping process component and the data extraction process component are the same.

16. The product of claim 14, further comprising a definition development process component that is responsible for building metadata definitions identifying selected fields from data object hierarchical data and defining relationships between the fields.

17. The product of claim 16, wherein at least the first or second mapping is based on at least one metadata definition.

18. The product of claim 14, further comprising at least one analytics process component that is responsible for developing analytics results related to data of the first data object, wherein the first structured data element is adapted for use with the analytics process component.

19. The product of claim 18, wherein the first data object is decoupled from the analytics process component.

* * * * *